(12) United States Patent
Eilert

(10) Patent No.: US 7,890,836 B2
(45) Date of Patent: Feb. 15, 2011

(54) METHOD AND APPARATUS OF CACHE ASSISTED ERROR DETECTION AND CORRECTION IN MEMORY

(75) Inventor: Sean Eilert, Penryn, CA (US)

(73) Assignee: Intel Corporation, Santa Clara, CA (US)

( * ) Notice: Subject to any disclaimer, the term of this patent is extended or adjusted under 35 U.S.C. 154(b) by 1095 days.

(21) Appl. No.: 11/638,689

(22) Filed: Dec. 14, 2006

(65) Prior Publication Data

US 2008/0148130 A1 Jun. 19, 2008

(51) Int. Cl.
*H03M 13/00* (2006.01)

(52) U.S. Cl. .................. 714/758; 714/786; 714/799; 714/755

(58) Field of Classification Search ............ 714/755, 714/758, 786, 799
See application file for complete search history.

(56) References Cited

U.S. PATENT DOCUMENTS

| | | | |
|---|---|---|---|
| 6,304,992 B1 * | 10/2001 | Cypher | 714/757 |
| 6,584,595 B2 * | 6/2003 | Cypher | 714/763 |
| 6,909,645 B2 | 6/2005 | Eilert | |
| 7,246,300 B1 * | 7/2007 | Au et al. | 714/758 |
| 7,296,213 B2 * | 11/2007 | Vainsencher et al. | 714/784 |
| 7,302,619 B1 * | 11/2007 | Tompkins et al. | 714/54 |
| 7,328,391 B2 * | 2/2008 | Hart et al. | 714/753 |
| 2004/0117688 A1 | 6/2004 | Vainsencher et al. | |
| 2004/0196723 A1 | 10/2004 | Eilert et al. | |
| 2006/0004984 A1 | 1/2006 | Morris et al. | |

FOREIGN PATENT DOCUMENTS

| | | |
|---|---|---|
| WO | WO 97/14109 | 4/1997 |
| WO | WO 99/05599 | 2/1999 |

OTHER PUBLICATIONS

International Search Report of Application No. PCT/US2007/084175 mailed on Mar. 20, 2008.

* cited by examiner

*Primary Examiner*—Esaw T Abraham
(74) *Attorney, Agent, or Firm*—Pearl Cohen Zedek Latzer, LLP

(57) ABSTRACT

A memory and a method of correcting and detecting an error in a codeword of a memory are presented. The method includes detection and correction of an error in a bit of the codeword by an error deception and correction engine, storing error correction information of the error in a cache. In the second detection of the same error in the same bit the correction of the error is done based on the stored error correction information.

7 Claims, 3 Drawing Sheets

METHOD AND APPARATUS OF CACHE ASSISTED ERROR DETECTION AND CORRECTION IN MEMORY

BACKGROUND OF THE INVENTION

Embodiments of the present invention relate generally to memory devices. Memory devices are used in many different types of systems to store code and data. Code and data are sometimes stored in two separate memories due to their access requirements. For example, code is typically written to a memory device as a large block of data during system manufacturing or code installation or update. Code is read in random fashion, directed by program counters, jumps and branches in software routines. Most data is written or read in blocks during application processing.

Direct execution of instructions stored in a memory requires that those instructions be made available in their correct form within relatively short initial access latency, perhaps 100 nS. Within the capabilities of the logic on these memories, it is not feasible to do more than single cell correction of the instructions prior to exporting these instructions to the system.

In many cases, multi-cell errors appear first as a single-cell error. At some later time, a second error occurs within the same codeword. With conventional techniques, this multi-cell error is not correctable and faulty data is returned to the system.

BRIEF DESCRIPTION OF THE DRAWINGS

The subject matter regarded as the invention is particularly pointed-out and distinctly claimed in the concluding portion of the specification. The invention, however, both as to organization and method of operation, together with objects, features and advantages thereof, may best be understood by reference to the following detailed description when read with the accompanied drawings in which:

The use of the same reference symbols in different drawings indicates similar or identical items.

Figure 1:
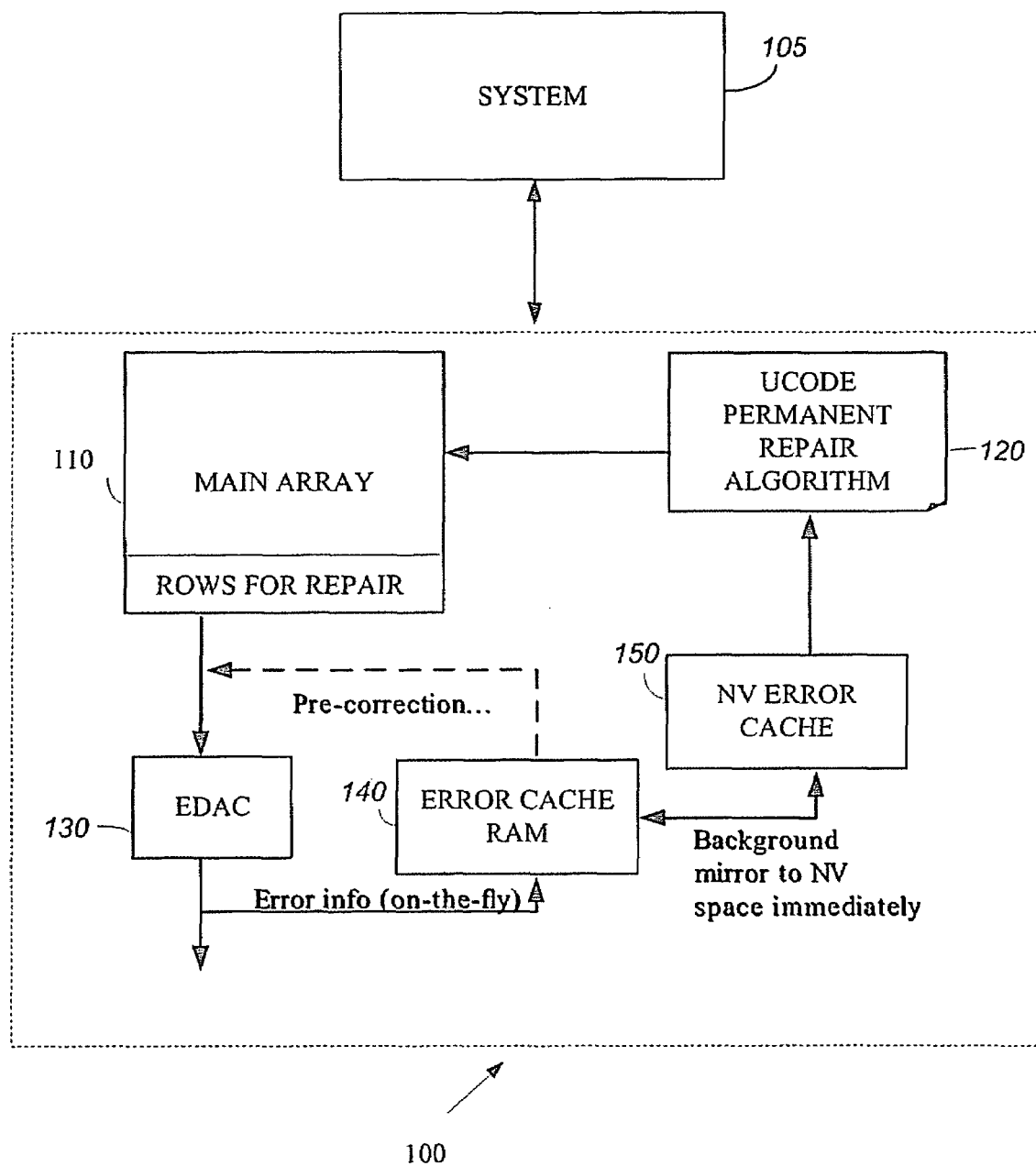
FIG. 1 is a schematic illustration of a block diagram of a memory according to one exemplary embodiment of the present invention.

It will be appreciated that for simplicity and clarity of illustration, elements shown in the figures have not necessarily been drawn,to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "exemplary embodiments" "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second." "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

The term "main array" may refer to an array of memory cells used for storage of code or data. The term "redundant elements" may refer to extra memory elements used for repair of faulty code or data. The term "EDAC engine" may refer to an error detection and correction circuit. The term "Error Cache RAM" may refer to a volatile memory used to store detected errors in a codeword and the term "NV Error Cache may refer to nonvolatile memory (NV) used to permanently store detected errors in a code word.

Turning first to FIG. 1, a schematic illustration of a block diagram of a memory 100 according to one exemplary embodiment of the present invention is shown. Although the scope of the present invention is not limited to this invention, memory device 100 includes a main array of memory cells 110, an UCODE permanent repair algorithm 120, an EDAC engine 130, an error cache RAM 140 and an NV error cache 150.

According to this exemplary embodiment of the invention, memory 100 may be a NOR FLASH and may include NOR based array of memory cells, although it should be understood that the scope of the present invention is in no way limited in this respect.

According to this exemplary embodiment of the invention, a system 105 (e.g., a computing platform) may access an address containing an error in main array 110. EDAC engine 130 may detect and correct the error in a bit of a codeword in the address accessed by the system, if desired. EDAC engine 130 may store error correction information of the bit of the codeword in error cache RAM 140. Error cache RAM 140 may use the error correction information to correct the error in the bit in further occurrence of error in this bit in this codeword.

According to this embodiment of the invention, the error cache RAM may store the error correction information of the bit in NV error cache 150. NV error cache may be a memory mirror in the case of power failure and/or power down of memory 100. In other exemplary embodiments, a fast read/write NV memory may replace the error cache RAM 140, if desired. A permanent repair of the codeword may be done by Ucode permanent repair algorithm 120.

According to embodiments of the invention, Ucode permanent repair algorithm 120 may be a method to permanently repaired errors in main array 110. For example, Ucode permanent repair algorithm 120 may run during erase algorithms, during power up, or in response to a user command allowing time for the device to fix known errors in main array 110. Ucode permanent repair algorithm 120 may erase a row with an error and instead to write a repaired row, downloaded form NV error cache 150. Ucode permanent repair algorithm 120 may effectively reduce the size requirements of the Error Cache RAM 140 and NV Error Cache 150.

Although the scope of the present invention is not limited in this respect, it should be understood that EDAC engine 130, Ucode permanent repair algorithm 120 and some other component of memory 100 may be implemented by hardware, by software, or by any desired combination of hardware and software.

Figure 2:
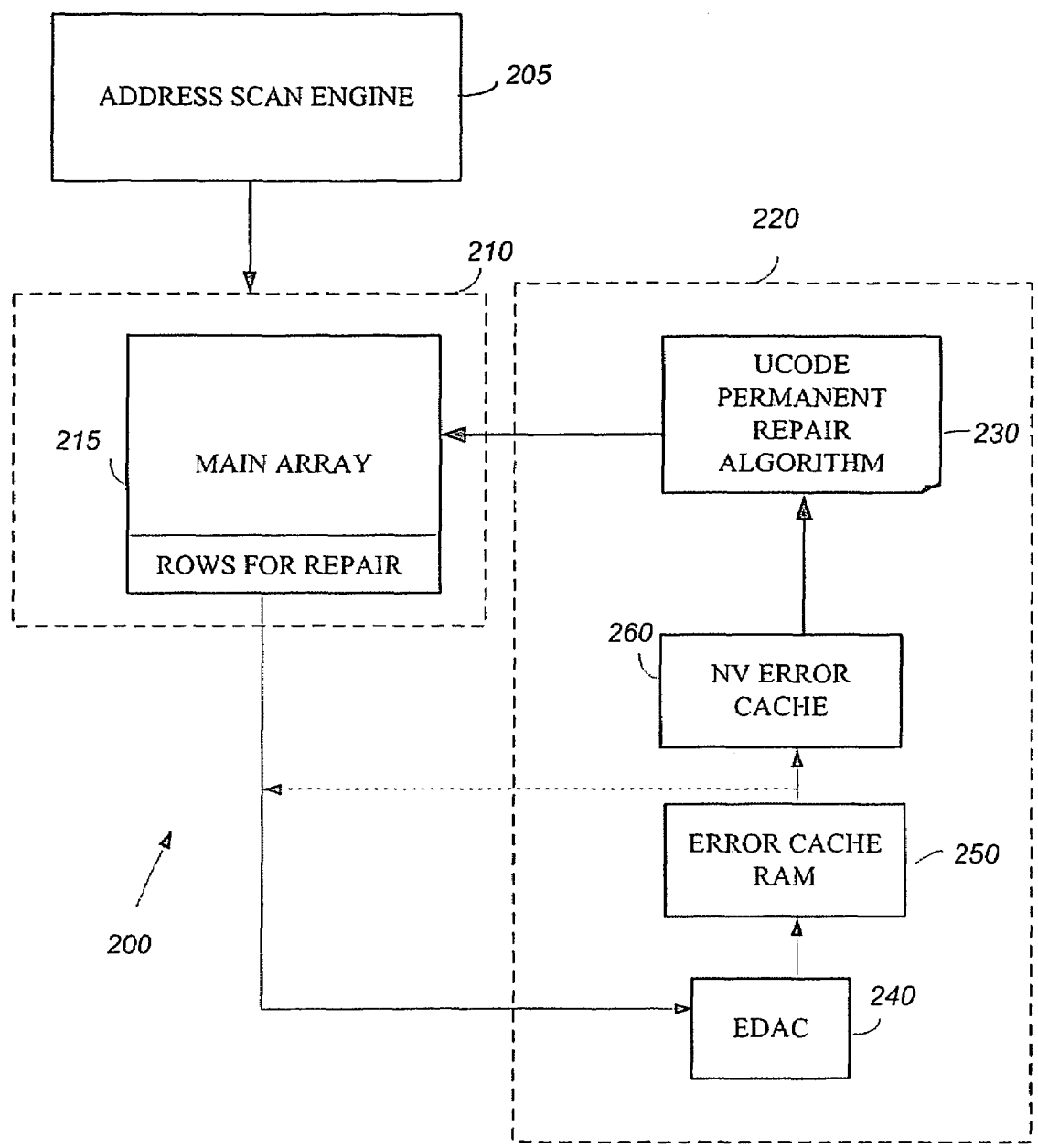
FIG. 2 is a schematic illustration of a block diagram of a memory system according to another exemplary embodiment of the present invention.

Turning to FIG. 2, a schematic illustration of a block diagram of a memory system 200 according to another exemplary embodiment of the present invention is shown. Although the scope of the present invention is not limited to this invention, memory system 200 includes a memory 210 and a memory controller 220. Memory 210 may include a main array 215. Memory controller 220 may include an UCODE permanent repair algorithm 230, an EDAC engine 240, an error cache RAM 250 and an NV error cache 260.

According to this exemplary embodiment of the invention, memory 210 may be a NAND Flash based memory and main array 215 may include NAND bases array of memory cells, although it should be understood that the scope of the present invention is in no way limited in this respect.

According to this exemplary embodiment of the invention, an address scan engine 205 may scan address of memory 210. Address scan engine 205 may access an address containing an error. EDAC engine 240 of memory controller 220 may detect and correct an error in a bit in a codeword, if desired. EDAC engine 240 may store error correction information of the bit of the codeword in error cache RAM 250. Error cache RAM 250 may use the error correction information to correct the error in the bit in further occurrence of error in this bit in this codeword.

According to this embodiment of the invention, the error cache RAM 250 may store the error correction information of the bit in NV error cache 260 as a memory mirrors in the case of power failure and/or power down of memory 210. In other exemplary embodiments a fast read/write NV memory may replace the Error Cache RAM 250. A permanent repair of the codeword may be done by Ucode permanent repair algorithm 230.

According to embodiments of the invention, Ucode permanent repair algorithm 230 may be a method to permanently repaired errors in memory 210. For example, Ucode permanent repair algorithm 230 may run during erase algorithms, during power up, or in response to a user command allowing time for the device to fix known errors in main array 215 of memory 210. Ucode permanent repair algorithm 230 may erase a row with an error and write an error corrected row, instead. The error corrected row may be downloaded form NV error cache 260, if desired.

Although the scope of the present invention is not limited in this respect, it should be understood that component of memory controller 220 such as, for example, EDAC engine 240, Ucode permanent repair algorithm 230 and other component may be implemented by hardware, by software, or by any desired combinations of hardware and software.

Figure 3:
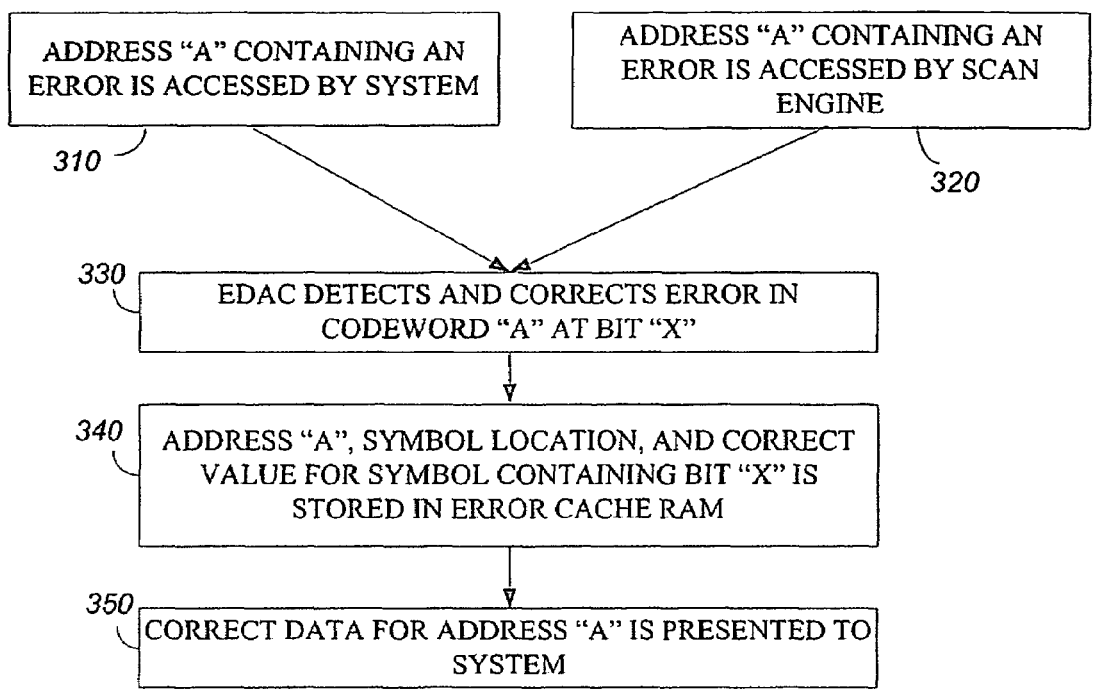
FIG. 3 is an illustration of a flow chart of a method of error detection and correction of an error in an errant codeword according to exemplary embodiments of the invention.

Turning to FIG. 3 an illustration of a flow chart of a method of error detection and correction of one or more bits in a codeword according to some embodiments of the invention is shown. According to some embodiments of the invention, the method may start with an address of a main array of a memory containing an error may be accessed by a system (e.g., a computing platform) as is shown in text block 310.

According to some other embodiments of the invention, the method may start with an address of a main array of a memory containing an error may accessed by a scan engine (not shown) as is shown in text block 320. In either embodiments of the invention, an EDAC engine (e.g., EDAC 130) may detect and correct the error in a bit (e.g., bit 4) of a codeword (e.g., codeword 100) as is shown in text block 330. The EDAC engine may store error correction information in an error cache RAM (text block 340). According to exemplary embodiments of the invention, the error correction information may include an address of the error row, a symbol location in the row and correction value for the symbol containing the bit with the error (e.g. bit 4). The method may end by presenting the corrected data for the desired address (e.g. address 1000) to the system, although the scope of the present invention is not limited in this regard.

Figure 4:
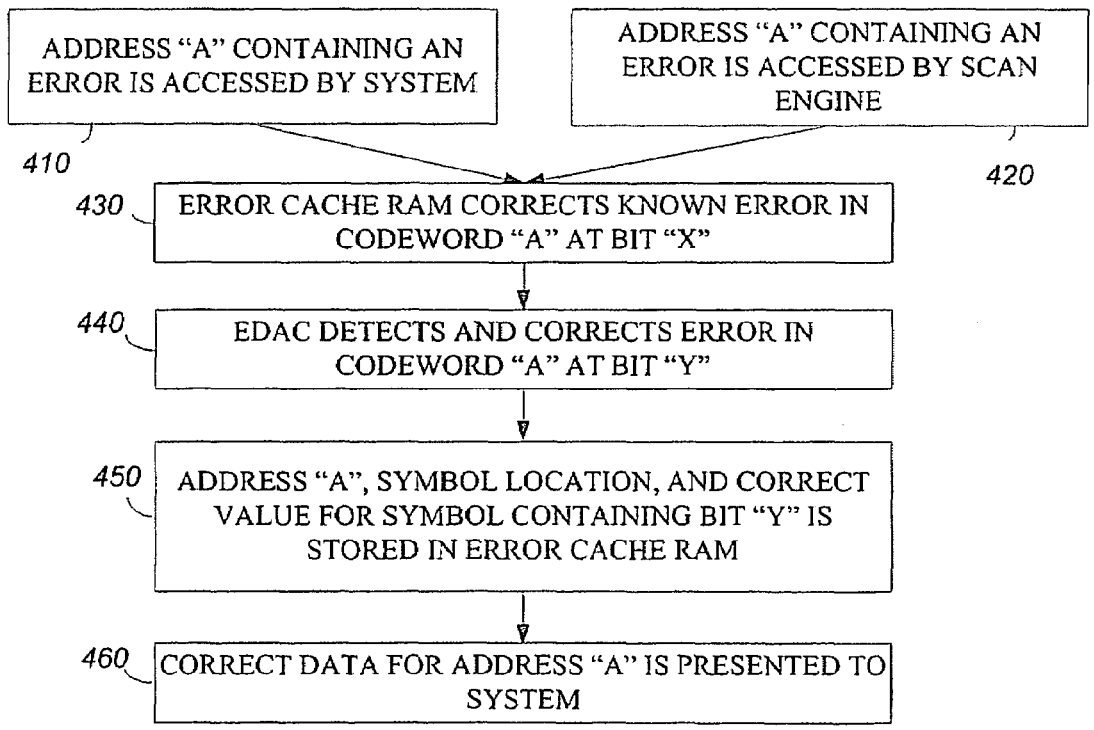
FIG. 4 is an illustration of a flow chart of a method of error detection and correction of subsequent errors in the codeword of FIG. 3 according to embodiments of the present invention.

Turning to FIG. 4 an illustration of a flow chart of a method of error detection and correction of subsequent errors in the codeword of FIG. 3 according to some others embodiments of the present invention is shown. According to some embodiments of the invention, the method may use the error correction information present to the system to correct known errors in bits of the codeword (as presented by the method of FIG. 3). The method may start with an address of a main array of a memory containing an error may accessed by a system (e.g., a computing platform) as is shown in text block 410.

According to some other embodiments of the invention, the method may start with an address of a main array of a memory containing an error may be accessed by a scan engine (not shown) as is shown in text block 420. In either embodiments of the invention, an error cache RAM (e.g., error cache RAM 140) may detect and correct the known error in a bit (e.g., bit 4) of a codeword (e.g., codeword 100) as is shown in text block 430. The EDAC engine may detect and correct another error in another bit (e.g., bit 6) of the codeword (text block 440). And may store the new error correction information in error cache RAM (text block 450). The new error correction information may include an address of the error row, a symbol location in the row and correction value for the symbol containing the bit with the error (e.g. bit 6). The method may end by presenting the corrected data for the desired address (e.g. address 1000) to the system, although the scope of the present invention is not limited in this regard.

An example using the methods of FIGS. 3 and 4 is now presented. According to this example, an error may occur on a first day in codeword 3 at bit 4. EDAC detects and corrects this error, presenting corrected data to the host system. This error is stored in the error cache RAM. In another day, another error occurs in codeword 3 at bit 6 (e.g., bit 4 error still exists). A main array output has errors in bits 4 and 6. According to embodiments of the invention, bit 4 error is corrected using information stored from the first day and bit 6 error is corrected using EDAC engine.

The techniques described above may be embodied in a computer-readable medium for configuring a computing system to execute the method. Tile computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers. workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method of correcting and detecting one or more errors in a codeword stored in a memory comprising:
   accessing an address containing a first error in a main array of memory cells;
   detecting and correcting an error in a bit of a codeword of the accessed address;
   storing error correction information of the error in a an error cache Random Access Memory (RAM) and in a nonvolatile (NV) memory, wherein the error correction information includes at least an address of an error row, a symbol location in the error row and a correction value for a symbol containing the bit; and
   permanently repairing the main array of memory cells by downloading a repaired row from the NV memory, erasing the error row and writing the downloaded row at the address of the error row.

2. The method of claim 1, comprising:
   scanning the main array of memory cells for detecting errors;
   detecting the error in the bit in the codeword and a new error in another bit in the codeword;
   correcting the error in the bit in the codeword using the stored error correction information; and
   correcting the new error in the bit in the codeword and storing error correction information for the new error at the error cache RAM and the NV memory.

3. The method of claim 1, comprising:
   storing the error correction information in a backup memory.

4. An apparatus comprising:
   an array of memory cells;
   an error detecting and correcting error engine to detect an error in a bit of a codeword and to generate error correction information for the bit of the codeword wherein, the error correction information includes at least an address of an error row, a symbol location in the error row and a correction value for a symbol containing the bit;
   an error cache random access memory (RAM) to store the error correction information of the detected error to be used to correct a further occurrence of the detected error in the bit of the codeword;
   a nonvolatile (NV) memory to store a backup of the error correction information; and
   a permanent repair algorithm to repair errors in the array of memory cells by downloading a repaired row from the NV memory and replacing a memory row containing a detected error with the downloaded repaired row.

5. The apparatus of claim 4, comprising:
   an address scan engine to scan rows of the array of memory cells for errors.

6. The apparatus of claim 4 wherein the array of memory cells comprises a NAND Flash memory.

7. The apparatus of claim 4 wherein the array of memory cells comprises a NOR Flash memory.

* * * * *